Figure 1:
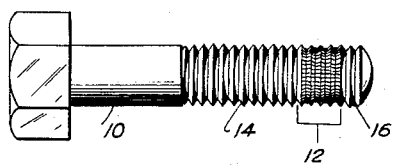

March 15, 1960  R. W. JAMES ET AL  2,928,446
SELF-LOCKING SCREW-THREADED FASTENING MEMBER
Filed April 5, 1957

INVENTORS
Raymond W. James
Richard E. Merrill
BY
AGENT

:# 2,928,446

SELF-LOCKING SCREW-THREADED FASTENING MEMBER

Raymond W. James, Lexington, and Richard E. Merrill, Wakefield, Mass., assignors to Arthur D. Little, Inc., Cambridge, Mass., a corporation of Massachusetts Application April 5, 1957, Serial No. 650,926

4 Claims. (Cl. 151—7)

This invention relates to compositions for locking threaded members for the purpose of increasing their frictional resistance to becoming unthreaded. Threaded members with which this composition is particularly useful include bolts, cap screws, nuts, and tapped holes. For brevity the discussion hereinafter will generally be directed to making self-locking bolts, although it will be obvious that this invention is equally applicable to making self-locking nuts and like threaded members.

A locking composition for a self-locking bolt or other threaded member, in order to be fully satisfactory, must fulfill a considerable number of requirements. Such a locking composition must be tough and cohesive enough that it does not ball up when the bolt is engaged or disengaged, even repeatedly. This composition must also be adhesive to the bolt, so that it is not stripped therefrom during engagement or disengagement. It should also be non-galling, so as to avoid undue thread wear. Another requirement is that the composition be operable on all run-of-mill bolts. This feature is important, as there are slight differences in diameter between the bolts and corresponding nuts of any specified size and thread, due to slight variations in manufacture. The locking composition must also be effective on repeated use, i.e. it must be retained sufficiently on the bolt so that the latter will still lock effectively after several engagements and disengagements. The composition must be of such a character that the bolt can be engaged and disengaged without damage to the bolt head or other parts of the assembly, even though the bolt, when engaged, is securely locked against working loose. Finally, the locking composition must be such that the bolt, when engaged, will not jar loose when subjected to vibration.

In our copending application Serial No. 566,751, filed February 20, 1956, now abandoned, and assigned to the assignee of the present application, we have described a locking composition which is especially useful for making self-locking bolts and other threaded members. Threaded members having such a locking composition on their threads are particularly satisfactory for use in most ordinary commercial applications where such members are desired.

We have found, however, that the locking composition described in the aforesaid copending application when used in the presence of oil and elevated temperatures (as in automobile crank cases, for example), usually shows a decrease in locking power. It is the principal object of this invention to provide an improved locking composition which has not only the characteristics hereinabove set forth for satisfactory locking compositions, but which is also designed especially for use on threaded members which are likely to be exposed to lubricating oil at temperatures of say 140°–200° F., and hence which finds particular use in the construction of automobile engines. Threaded members provided with the locking composition of this invention may in fact be submerged in lubricating oil during their operating life, without damage to the locking power of this composition. This composition is also well adapted for use in tapped holes (e.g. in engine blocks), which are generally made oversize.

The locking composition of this invention is specifically formulated to provide toughness and some degree of flow under pressure. It does not exhibit a sharp softening or melting point, but softens only gradually over a wide temperature gradient. Exceptionally high torque values are developed during insertion and removal over a range of temperature from normal ambient up to about 200° F. The locking composition of the aforesaid copending application, on the other hand, is much more readily softened by heat, including frictional heat due to inserting and removing the threaded member.

The locking composition of this invention consists of a vinyl chloride-vinyl acetate-maleic acid tripolymer resin in major amount, an epoxy resin in minor amount, and if desired a small amount of a thermosetting resin containing excess formaldehyde or hexamethylenetetramine, together with suitable solvent or solvents. The solvents are used in preparing the composition, but are removed during the processing so that they are not present (at least to any significant extent) on the finished bolts.

The tripolymer is a polymerization product of about 85–90 parts vinyl chloride, 10–15 parts vinyl acetate, and ½–2 parts maleic acid, parts being by weight.

The epoxy resin is a condensation product of epichlorohydrin and a compound consisting of one or more aryl groups having hydroxy and alkyl substituents and no other substituents. The epoxy resin is initially in liquid form and of relatively low molecular weight, i.e. about 200 to 500.

The optional thermosetting resin referred to may be phenol - formaldehyde, melamine - formaldehyde, urea-formaldehyde, or the like, containing a small amount, about 5% preferably, of hexamethylene tetramine or of excess formaldehyde. The amount of this thermosetting resin used in the composition is in any event less than half the amount, by weight, of the epoxy resin.

In carrying out the procedure of this invention, the bolts or other threaded fastenings are first prepared by degreasing in known manner. A metered quantity of the locking composition is then applied to the threaded portion of the fastening in a location where contact with the mating thread of the nut or other threaded member is assured. It has been found in practice that the first thread at the extreme point of the fastening should be kept free of the locking composition, for ease in starting in a nut or tapped hole. An excessive amount of the locking composition should be avoided, because the excess composition accumulates under the shoulder of the bolt or on the washer face of the nut, and some of the excess material falls out during driving and may interfere with, or damage, associated structures such as electrical units. When applying the composition, the fastening should be rotated continuously in order to promote uniform application, and in such a manner that the locking composition does not flow onto the adjacent threads while in the liquid state.

After application, the treated member is heated to drive off the solvent and provide a coating of the dry locking composion on the threads.

In practice it has been found that with ½–13 x 2¼ inch cap screws, the approximate minimum quantity of the dried (solvent-free) locking composition required to provide satisfactory torque results in all classes of fits is about 0.6 gram, while the approximate maximum allowable quantity is about .09 gram. It has also been found that the locking composition should be confined to about four complete threads of these screws, for best results.

Proportionately larger or smaller amounts of the locking composition are used on proportionately larger or smaller fastenings.

Figure 2:
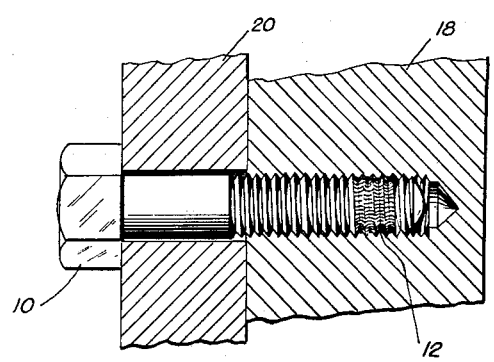

This invention will be further illustrated by reference to the accompaning drawings, wherein Fig. 1 shows a cap screw 10 with a coating 12 applied to about four complete threads, leaving the first thread 16 clear, as described above, the threads 14 near the head of the screw being preferably uncoated; and Fig. 2 shows cap screw 10 in position holding elements 18 and 20 together, the locking coating being indicated diagrammatically at 12.

An example of the locking composition of this invention is given below. This example, as will be obvious from what follows, is to be considered as illustrative rather than limiting.

Example

| | Parts by weight |
|---|---|
| Tripolymer (Vinylite resin type VMCH) | 100 |
| Epoxy resin (Epon 828) | 25 |
| Thermosetting resin (Durez 12687) | 1 |
| Cyclohexanone | 245 |

The tripolymer is dissolved in the cyclohexanone at room temperature, or at a higher temperature if desired to promote mixing. The epoxy resin and the thermosetting resin are then added to the mixture and stirred until complete solution is attained. This solution is applied to the bolts or other threaded members, and dried to remove the cyclohexanone, with heating if desired, to provide a coating of the dry locking composition on the threads, in the manner already mentioned.

In practice, if the quantity of dried locking composition present on the threads is controlled between the maximum and minimum quantity limits hereinabove referred to and is at the same time confined to about four complete threads, the prevailing torque for the first removal will be about 75 inch-pounds, and for the fifth removal about 50 inch-pounds.

The Vinylite resin VMCH, which is a product of the Bakelite Company, is a tripolymer of vinyl chloride, vinyl acetate and maleic acid in the ratio of approximately 86:13:1.

Epon 828, a product of Shell Chemical Company, is a low molecular weight (approximately 350) condensation polymer of epichlorohydrin and diphenylol propane, and has an epoxy value of approximately 0.5 per 100 grams of resin. It is an aliphatic aromatic polyether with terminal epoxy-groups and pendant hydroxyl groups.

Durez 12687, produced by Durez Plastics, Inc., a Division of Hooker Electro Chemical Company, is a thermosetting phenol formaldehyde resin containing approximately 5% hexamethylene tetramine, has a melting point of 70–75° F. and when cured is heat resistant and oil insoluble.

The amount of ingredients in the locking composition described above in the example may be varied considerably, as indicated below, and still provide a lock bolt or other threaded member with the desired locking qualities hereinabove set forth. Based on 100 parts by weight of the tripolymer, the epoxy resin may be varied between 5 and 35 parts by weight, and the thermosetting resin may be varied between ½ part and 15 parts by weight, but in any event being present in an amount not more than about half the amount of epoxy resin. If less than about 5 parts epoxy resin per 100 parts of tripolymer are used the resulting locking composition has relatively poor heat stability, whereas if more than about 35 parts epoxy resin are used, the locking composition is too highly plasticized to provide good locking action. As already mentioned, the thermosetting resin may be omitted entirely, but as a rule it is preferred when the higher amounts of epoxy resin are used. Its function appears to be a reaction with a portion of the epoxy resin to form a high molecular weight cross-linked product which is compatible with the tripolymer and which raises the softening point of the composition substantially.

The thermosetting resin may be a melamine-formaldehyde resin or a urea-formaldehyde resin but in any event should have a small percentage of excess formaldehyde or hexamethylenetetramine.

We claim:

1. A screw-threaded fastening member having a coating of a composition consisting essentially of a mixture of 100 parts of a tripolymer constituted of about 85–90 parts vinyl chloride, 10–15 parts vinyl acetate, and ½–2 parts maleic acid, and 5 to 35 parts of a liquid epoxy resin of molecular weight about 200 to 500, all parts being by weight, said coating being confined to the threaded portion of said screw-threaded fastening member.

2. A screw-threaded fastening member having a coating of a composition as claimed in claim 1, said composition also containing a small amount of a thermosetting resin containing excess hexamethylene tetramine, said amount being less than half the amount of epoxy resin present.

3. A screw-threaded fastening member having a coating of a composition consisting essentially of a mixture of 100 parts of a tripolymer of vinyl chloride, vinyl acetate and maleic acid in the approximate weight ratio of 86:13:1 respectively, 5 to 35 parts of an epoxy resin consisting of a polymerization product of epichlorohydrin and diphenylol propane, and up to 15 parts of a thermosetting resin selected from the group consisting of phenol-formaldehyde, melamine-formaldehyde, and urea-formaldehyde resins, said thermosetting resin containing excess hexamethylene tetramine and being present in an amount less than half that of said epoxy resin, all parts being by weight, said coating being confined to the threaded portion of said screw-threaded fastening member.

4. A screw-threaded fastening member having a coating of a composition as claimed in claim 3, wherein the amount of epoxy resin is about 25 parts and the amount of thermosetting resin is about one part, by weight.

References Cited in the file of this patent

UNITED STATES PATENTS

| 2,321,414 | Parker | June 8, 1943 |
| 2,795,565 | Newey | June 11, 1957 |

UNITED STATES PATENT OFFICE

CERTIFICATE OF CORRECTION

Patent No. 2,928,446                          March 15, 1960

Raymond W. James et al.

It is hereby certified that error appears in the printed specification of the above numbered patent requiring correction and that the said Letters Patent should read as corrected below.

Column 2, line 67, for "0.6 gram" read -- .06 gram --.

Signed and sealed this 23rd day of August 1960.

(SEAL)
Attest:

KARL H. AXLINE
Attesting Officer

ROBERT C. WATSON
Commissioner of Patents